(12) United States Patent
Martinson

(10) Patent No.: US 8,701,264 B2
(45) Date of Patent: Apr. 22, 2014

(54) COMPENSATING FOR FASTENER LOCATION VARIABILITY

(75) Inventor: Howard E. Martinson, Tempe, AZ (US)

(73) Assignee: The Boeing Company, Chicago, IL (US)

( * ) Notice: Subject to any disclaimer, the term of this patent is extended or adjusted under 35 U.S.C. 154(b) by 767 days.

(21) Appl. No.: 12/943,308

(22) Filed: Nov. 10, 2010

(65) Prior Publication Data

US 2011/0056065 A1 Mar. 10, 2011

Related U.S. Application Data

(62) Division of application No. 11/480,097, filed on Jun. 29, 2006, now Pat. No. 7,857,565.

(51) Int. Cl.
B23P 11/00 (2006.01)
(52) U.S. Cl.
USPC ....................................... 29/525.01
(58) Field of Classification Search
USPC .............. 29/525.01; 411/539, 160, 533, 136, 411/149, 531, 534; 280/86.753, 86.754
See application file for complete search history.

(56) References Cited

U.S. PATENT DOCUMENTS

| | | | |
|---|---|---|---|
| 2,272,118 A | 2/1942 | Imse et al. | |
| 2,525,217 A | 10/1950 | Glitsch | |
| 2,718,691 A | 9/1955 | Sussenbach | |
| 2,812,675 A | 11/1957 | Norlander | |
| 2,909,933 A | 10/1959 | Kalous | |
| 2,934,684 A | 4/1960 | Fegan | |
| 2,996,735 A | 4/1961 | Knocke | |
| 3,153,974 A | 10/1964 | Canning | |
| 3,222,053 A | 12/1965 | Severdia | |
| 3,495,907 A | 2/1970 | Rogers | |
| 3,658,107 A | 4/1972 | Perina | |
| 4,311,319 A | 1/1982 | Snyder et al. | |
| 5,090,855 A | 2/1992 | Terry | |
| 5,190,423 A | 3/1993 | Ewing | |
| 5,203,656 A | 4/1993 | McKinlay | |
| 5,779,260 A * | 7/1998 | Reilly et al. | 280/86.754 |
| 5,888,012 A * | 3/1999 | Nygren et al. | 403/13 |
| 6,550,795 B1 | 4/2003 | Schlosser et al. | |
| 6,732,982 B1 | 5/2004 | Messinger | |
| 7,406,777 B2 | 8/2008 | Gröver et al. | |
| 7,441,308 B1 | 10/2008 | Pappas | |
| 2002/0187020 A1 | 12/2002 | Julien | |
| 2004/0159194 A1 | 8/2004 | Ting | |

* cited by examiner

Primary Examiner — David Bryant
Assistant Examiner — Moshe Wilensky
(74) Attorney, Agent, or Firm — Toler Law Group, PC

(57) ABSTRACT

A particular method includes disposing a first structure and a second structure adjacent to each other. A fastener is extended from the second structure through a hole and a counterbore defined in the first structure. A first bushing is placed over the fastener by receiving the fastener through an elongated opening defined in the first bushing. When the fastener is not centered relative to the hole, the first bushing is rotated around the fastener and a position of the fastener is adjusted in the elongated opening until the first bushing is received into the counterbore defined in the first structure. The fastener is received through an opening defined in a second bushing. The first structure and the first and second bushings are secured onto the fastener.

20 Claims, 14 Drawing Sheets

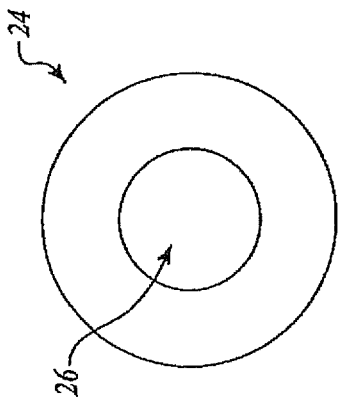
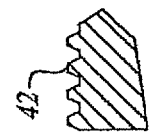
FIG.3E  FIG.3F
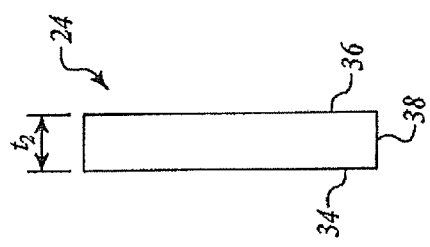
FIG.3D
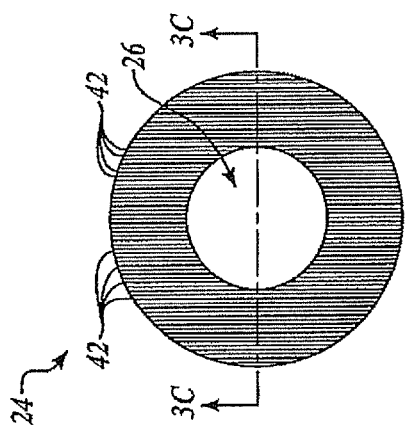
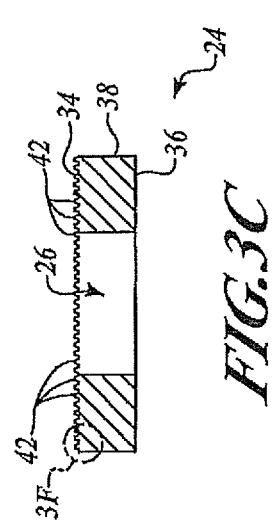
FIG.3B  FIG.3C

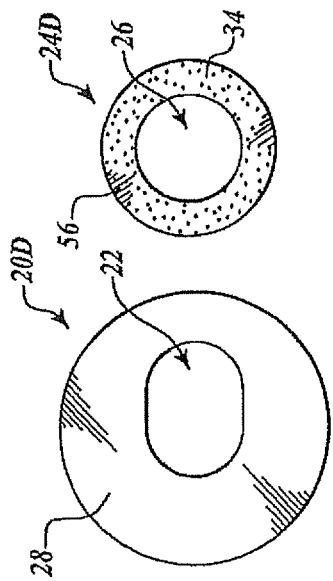
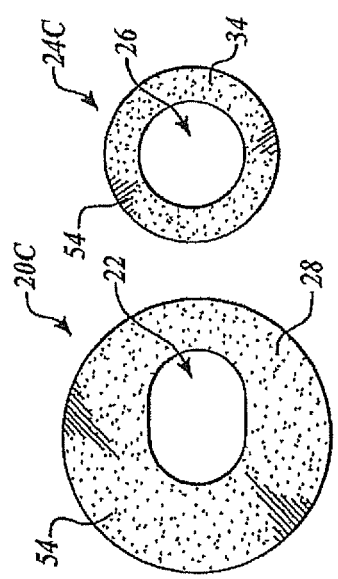

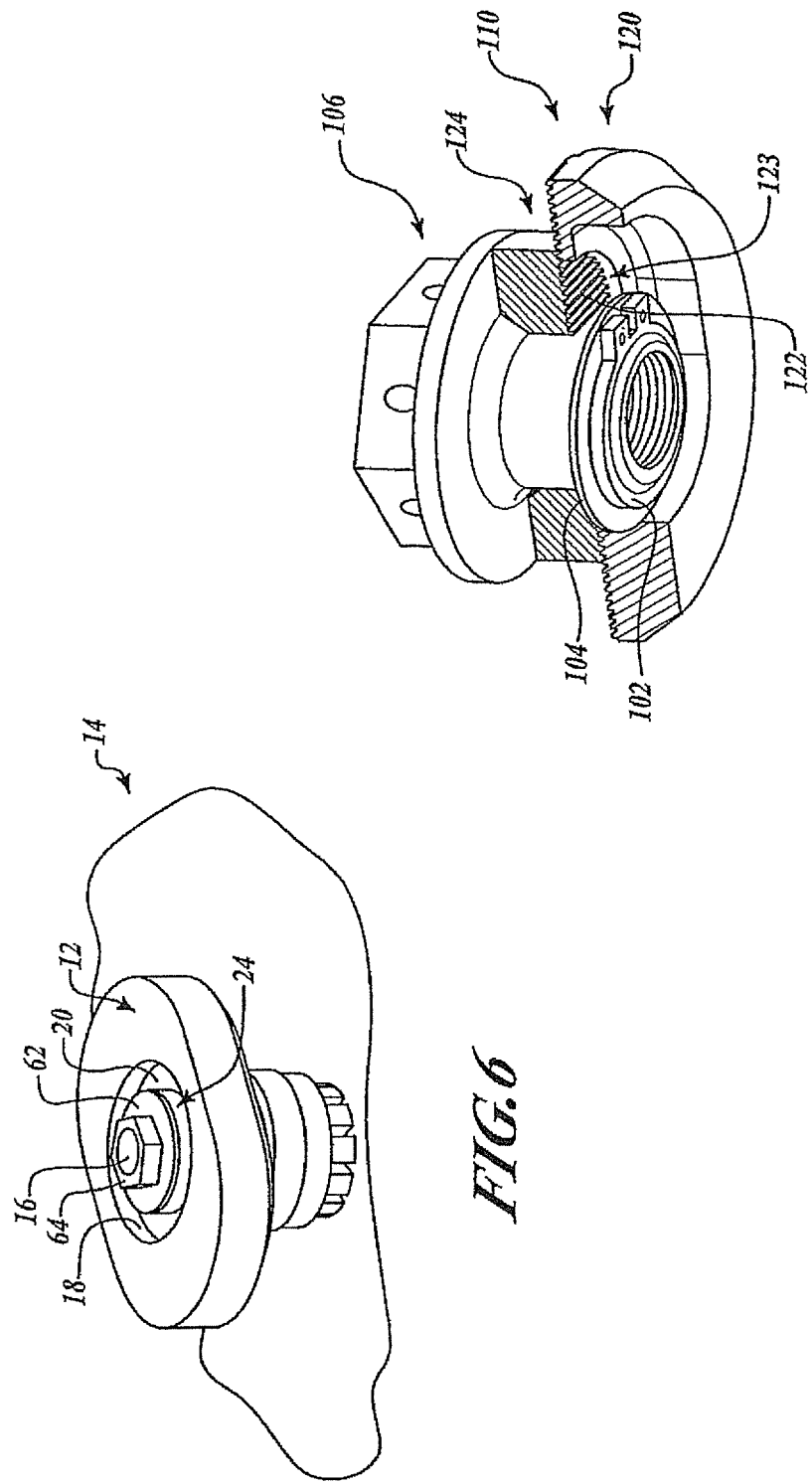

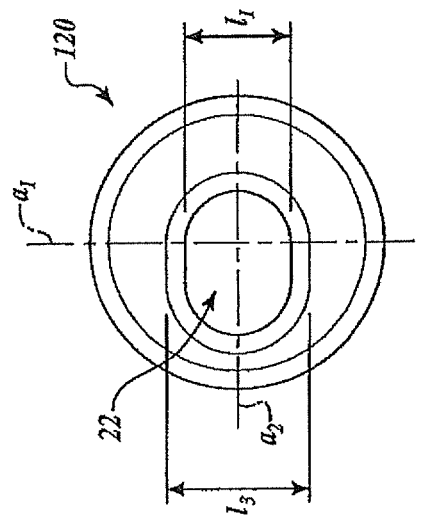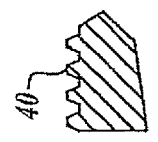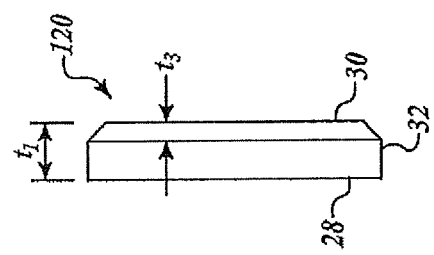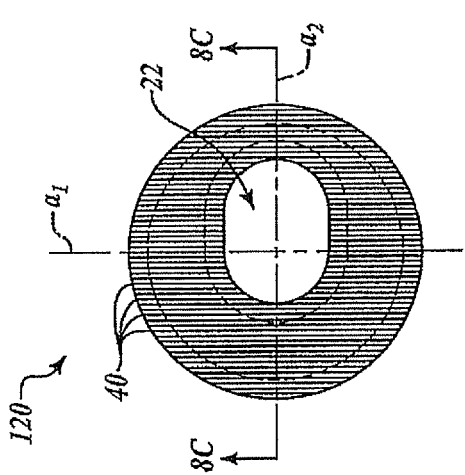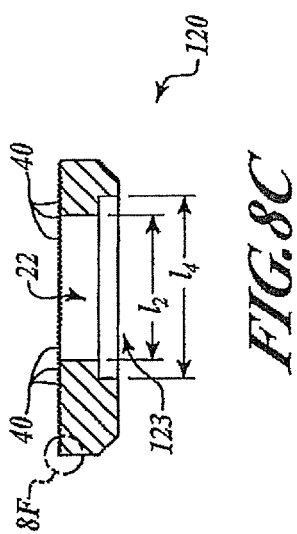

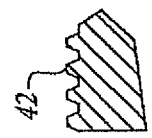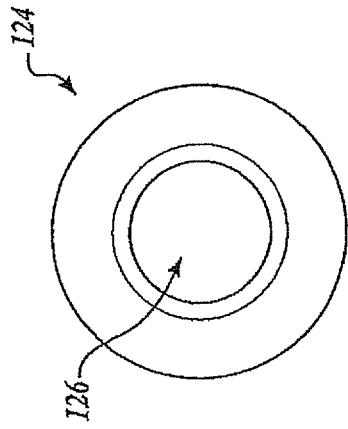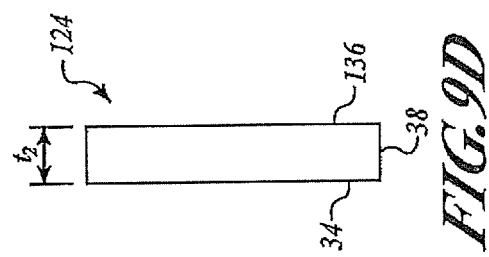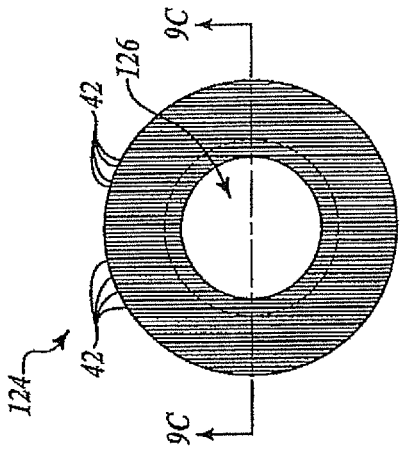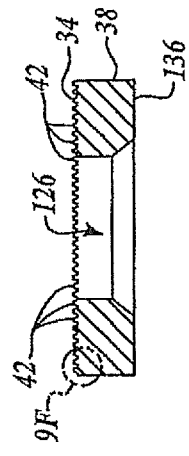

COMPENSATING FOR FASTENER LOCATION VARIABILITY

CLAIM OF PRIORITY

This divisional application claims priority from U.S. patent application Ser. No. 11/480,097, filed on Jun. 29, 2006, which is incorporated herein by reference in its entirety.

BACKGROUND

Modifications or alterations to a vehicle or a facility may be made from time to time during the service life of a vehicle or facility. For example, additional equipment or systems may be added, either permanently or on a temporary basis.

Equipment or systems may be attached directly to attach points of the structure of the vehicle or facility. Alternately, a mounting structure, such as for example a false floor or the like, may be attached to the attach points, and the equipment or systems may be mounted on the mounting structure as desired. This latter approach permits the installation of equipment or systems without modifications to the structure of the vehicle or facility. Regardless of whether equipment, systems, or mounting structures (collectively, "mounted structure") are attached to the attach points, the mounted structure is attached to the attach point via a fastener.

Mounting holes for receiving the attach point fasteners are planned and defined in the mounted structure based upon documented location of the attach point fasteners. In some applications the mounting hole may be counter-bored such that the attach point fastener will not extend past an upper surface of the mounted structure. The mounted structure is placed on the structure of the vehicle or facility such that the attach point fasteners are received in the mounting holes.

However, a variability may exist between documented location of an attach point fastener and actual location of the attach point fasteners. This variability may result from, without limitation, inaccurate documentation, assembly processes with large tolerances for inaccurate location, heavy use, damage, field repairs, or any combination thereof. In some instances, the variability may be on the order of around an inch or so. However, there is no limit to possible variability.

In the event of a large variability, a mounting hole that was defined based on a documented location of a fastener may not align properly with the actual location of the fastener. In the case of a counter-bored mounting hole, attachment may be precluded even if the attach point fastener fits within the counter-bored hole. This is because bushings or washers received within the counter-bored hole may not align with the fastener.

In such cases, the mounting hole may be re-drilled. Alternately, in some cases, a new mounted structure may have to be fabricated. Such rework introduces delays and cost increases into a modification or alteration.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and methods which are meant to be exemplary and illustrative, not limiting in scope. In various embodiments, one or more of the problems described above in the Background have been reduced or eliminated, while other embodiments are directed to other improvements.

In an exemplary, non-limiting bushing assembly, a first bushing defines a first opening therethrough. The first opening has a first dimension along a first axis that is sized to receive a fastener therethrough. The first opening has a second dimension along a second axis, and the second dimension is larger than the first dimension. A second bushing defines a second opening therethrough that is sized to receive a fastener therein. Means are provided for engaging the first and second bushings.

According to an aspect, the engaging means may be provided by serrations defined on a surface of the first bushing and serrations defined on a surface of the second bushing. Alternately, the engaging means may be provided by, without limitation: an abrasive surface treatment defined on a surface of the first bushing and defined on a surface of the second bushing; an adhesive affixed to a surface of at least one of the first and second bushings; hook and loop fasteners affixed to the first and second bushings; or the like, as desired for a particular application.

According to another aspect, the first opening may be a slot. Further, the dimension along the second axis of the slot may be at least one-half an amount of variability of an actual location of a fastener from a documented location of the fastener.

In another exemplary, non-limiting bushing assembly, a first bushing defines a first slot therethrough that has a first dimension along a first axis that is sized to receive a fastener therethrough. The first bushing has a second dimension along a second axis that is larger than the dimension along the first axis. The first bushing defines a second slot therethrough that has a third dimension along the first axis that is bigger than the first dimension and that has a fourth dimension along the second axis that is larger than the second dimension. A second bushing defines a second opening therethrough that is sized to receive a fastener therein. Means are provided for engaging the first and second bushings.

Exemplary bushing assemblies may be used in attaching two structures to each other. In an exemplary method of attaching two structures to each other, a first structure and a second structure are disposed against each other such that a fastener that extends from the second structure is received in a counter-bored hole defined in the first structure. An actual location of the fastener may have a variability from a documented location of the fastener, and the counter-bored hole is defined to receive the fastener in the documented location of the fastener. A first bushing is placed into the counter-bored hole, and the first bushing defines a first opening therethrough that has a first dimension along a first axis that is sized to receive the fastener therethrough and that has a second dimension along a second axis that is larger than the dimension along the first axis. The first bushing is rotated until the first bushing receives the fastener therein. A second bushing is placed onto the first bushing, and the second bushing defines a second opening therethrough that is sized to receive the fastener therein. The first and second bushings engage with each other, and the first structure and the first and second bushings are secured onto the fastener.

In addition to the exemplary embodiments and aspects described above, further embodiments and aspects will become apparent by reference to the drawings and by study of the following detailed description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 3B-3F are plan views of the bushing of FIG. 3A;

FIGS. 4C-4H are top plan views illustrating exemplary engagement of an exemplary compensator bushing and an exemplary lock bushing;

FIG. 6 is a perspective view of two structures attached to each other using an exemplary bushing assembly;

FIG. 7 is a partial cutaway perspective view of another exemplary bushing assembly held together with a retainer clip;

FIGS. 8B-8F are plan views of the bushing of FIG. 8A;

FIGS. 9B-9F are plan views of the bushing of FIG. 9A

DETAILED DESCRIPTION

Figure 1:
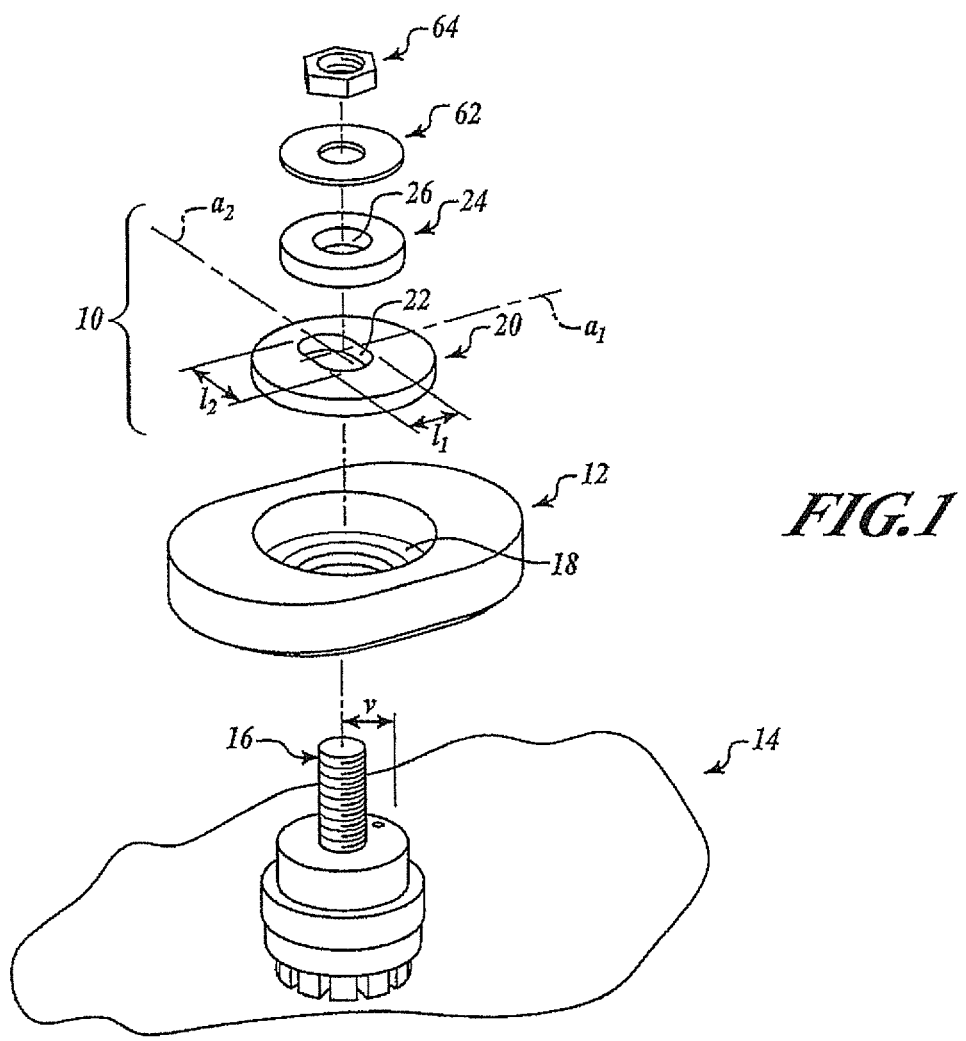
FIG. 1 is an exploded perspective view of a buildup of two structures and an exemplary bushing assembly.

Given by way of overview and referring to FIG. 1, an exemplary bushing assembly 10 may be used in attaching two structures 12 and 14 to each other. Given by way of non-limiting example, the structures 12 and 14 are disposed against each other such that a fastener 16 that extends from the structure 14 is received in a counter-bored hole 18 defined in the structure 12. An actual location of the fastener 16 may have a variability, v, from a documented location (not shown for clarity) of the fastener 16, and the hole 18 is defined to receive the fastener 16 in the documented location of the fastener 16. A compensator bushing 20 is placed in the hole 18, and the compensator bushing 20 defines an opening 22 therethrough that has a dimension $1_1$ along an axis $a_1$, that is sized to receive the fastener 16 therethrough and that has a dimension $1_2$ along an axis $a_2$ that is larger than the dimension $1_1$. The compensator bushing 22 is rotated until the compensator bushing 20 is received in the counter-bored hole 18. A lock bushing 24 is placed onto the compensator bushing 20, and the lock bushing 24 defines an opening 26 therethrough that is sized to receive the fastener 16 therein. The bushings 20 and 24 engage with each other, and the structure 12 and the bushings 20 and 24 are secured onto the fastener 16, thereby securing the structure 12 to the structure 14. Details will now be set forth below.

Referring additionally to FIGS. 2A-2F, the compensator bushing 20 defines surfaces 28 and 30 and a side 32. The compensator bushing 20 has an outer diameter that is equalized with a diameter of the counter-bore of the counter-bored hole 18. The opening 22 extends completely through the compensator bushing 20 from the surface 28 to the surface 30. In an exemplary embodiment, the opening 22 is a slot. The compensator bushing 20 may have any shape as desired for a particular application. While the compensator bushing 20 is shown herein as having a circular (that is, round) shape, the compensator bushing 20 may have any shape, such as without limitation oval, or square, or rectangular, or the like, as desired for a particular application.

The dimension $1_1$ is sized to receive therein the fastener 16. The dimension $1_2$ is bigger than the dimension $1_1$ and is sized to accommodate the variability v of the actual location of the fastener 16 from the documented location of the fastener 16. Because the compensator bushing 20 can be rotated 360 degrees in the counter-bored hole 18, the opening 22 can accommodate the variability v that is up to two times the dimension $1_2$. That is, the dimension $1_2$ can be as little as one-half the length of the variability v. Thus, the dimension $1_2$ is at least one-half the length of the variability v. The full variability v can be accommodated by rotating the compensator bushing 20 in the counter-bored hole 18 until the opening 22 is aligned to receive the fastener 16 therein. Given by way of non-limiting example, when the variability v is around ½ inch, the dimension $1_2$ can be at least ¼ inch.

The compensator bushing 20 may have any thickness $t_1$, as desired for a particular application. As a result, the thickness $t_1$ may be sufficiently thin that the compensator bushing 20 may be considered and referred to as washer. Thus, the term "bushing" as used herein is intended to include "washer" within its meaning. Further, the compensator bushing 20 may be made from any material whatsoever, such as without limitation plastic or metals such as stainless steel or titanium, as desired for a particular application. Factors that may be taken into consideration for selection of materials may include: whether the compensator bushing 20 will be used to transfer load; electro-corrosive compatibility with materials used for the fastener 16 and the structures 12 and 14 (such as avoiding use of dissimilar metals); environmental factors; or the like.

Referring additionally to FIGS. 3A-3F, the lock bushing 24 defines surfaces 34 and 36 and a side 38. The lock bushing 24 has an outer diameter that is smaller than a diameter of the counter-bore of the counter-bored hole 18. The opening 26 extends completely through the lock bushing 24 from the surface 34 to the surface 36. The opening 26 has a diameter that is sized to receive the fastener 16 therein. The lock bushing 24 may have any shape as desired for a particular application. While the lock bushing 24 is shown herein as having a circular (that is, round) shape, the lock bushing 24 may have any shape, such as without limitation oval, or square, or rectangular, or the like, as desired for a particular application.

The lock bushing 24 may have any thickness $t_2$ as desired for a particular application. As a result, the thickness $t_2$ may be sufficiently thin that the lock bushing 24 may be considered and referred to as washer. Thus, the term "bushing" as used herein is intended to include "washer" within its meaning. Like the compensator bushing 20, the lock bushing 24 may be made from any material whatsoever, such as without limitation plastic or metals such as stainless steel or titanium, as desired for a particular application. Factors that may be taken into consideration for selection of materials for the lock bushing 24 are the same as those set forth above for the compensator bushing 20.

The compensator bushing 20 and the lock bushing 24 each include features that cooperate together to provide means for engaging the compensator bushing 20 and the lock bushing 24. In an exemplary embodiment, serrations 40 are defined on the surface 28 of the compensator bushing 20 and serrations 42 are defined on the surface 34 of the lock bushing 24. The serrations 40 are parallel and the serrations 42 are parallel. In an exemplary embodiment, the serrations 40 and 42 extend across the entire surfaces 28 and 34, respectively.

The serrations 40 and 42 are made as small as desired for a particular application. Use of small serrations allows for finer control of variability of tolerances and a tighter tolerance with the shaft of the fastener 16. In an exemplary, non-limiting embodiment, the serrations 40 and 42 are made according to industry machining standards.

Figure 2A:
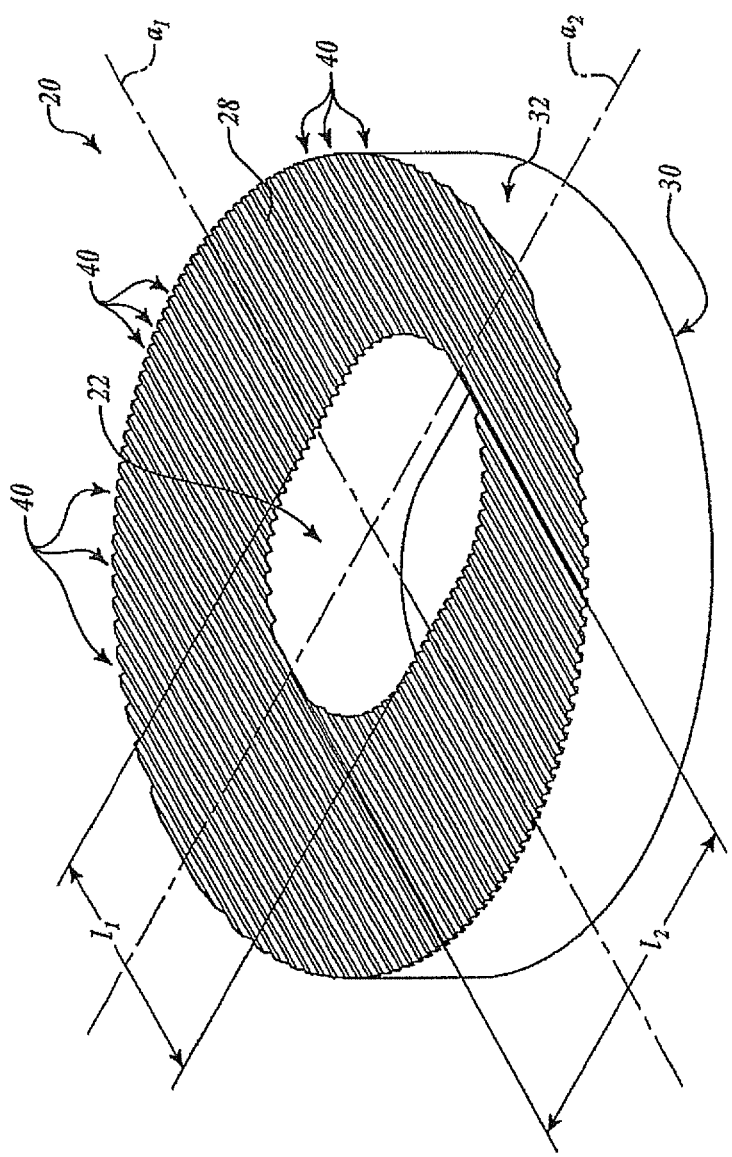
FIG. 2A is a perspective view of an exemplary compensator bushing.
Figure 2E:
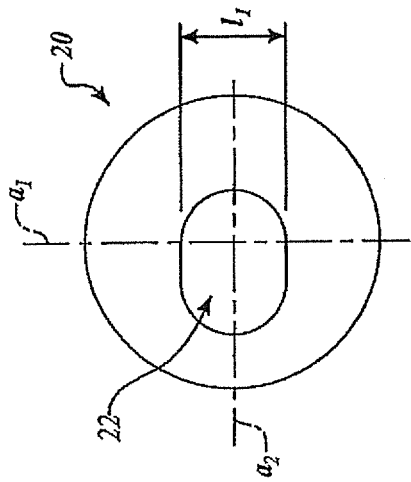
FIGS. 2B-2F are plan views of the bushing of FIG. 2A.
Figure 2F:
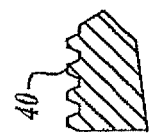
Figure 2D:
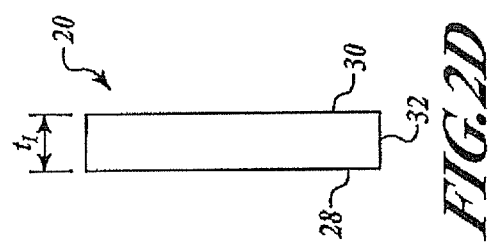
Figure 2B:
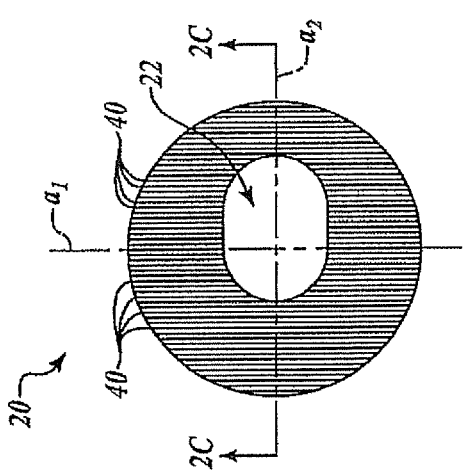
Figure 2C:
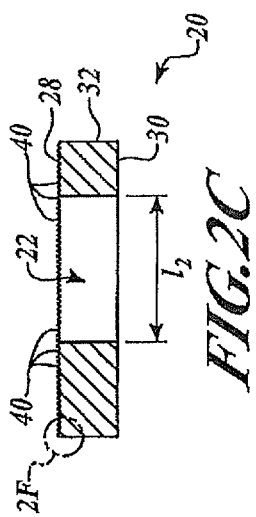
Figure 3A:
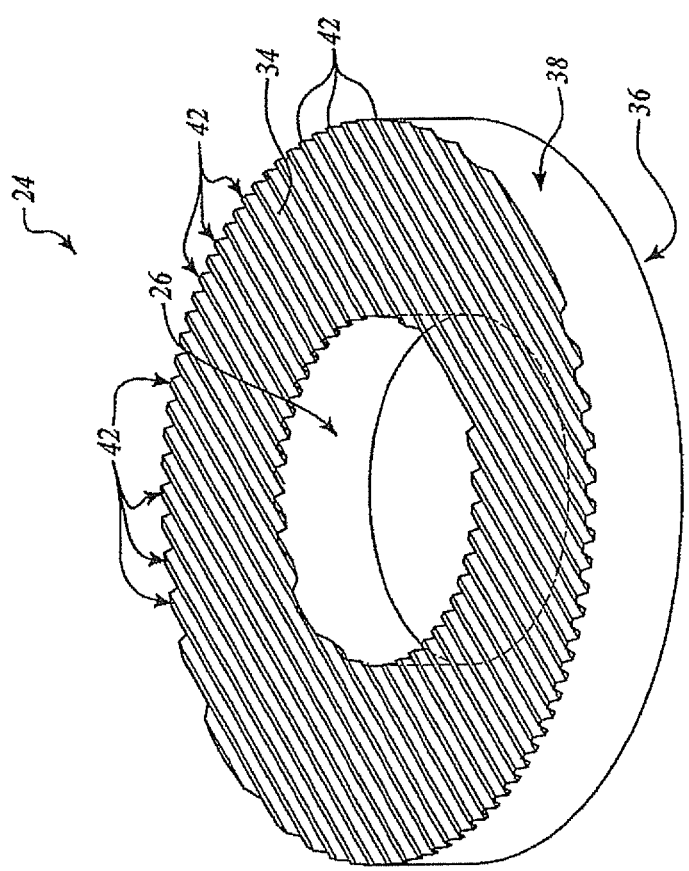
FIG. 3A is a perspective view of an exemplary lock bushing.

As best seen in FIGS. 2A and 2B, in an exemplary embodiment the serrations 40 are aligned on the surface 28 of the compensator bushing 20 such that their axes form a non-zero angle with the axis $a_2$ (that is, the serrations 40 are not parallel with the axis $a_2$). The non-zero angle suitably is no more than ninety degrees. The amount of load that can be transferred is maximized when the non-zero angle is ninety degrees. The amount of load that can be transferred is reduced as the non-zero angle approaches zero. This reduction results because, after the lock bushing 24 is placed onto the compensator bushing 20, the lock bushing 24 could slide on the serrations 40 and 42 along the axis $a_2$.

Figure 4B:
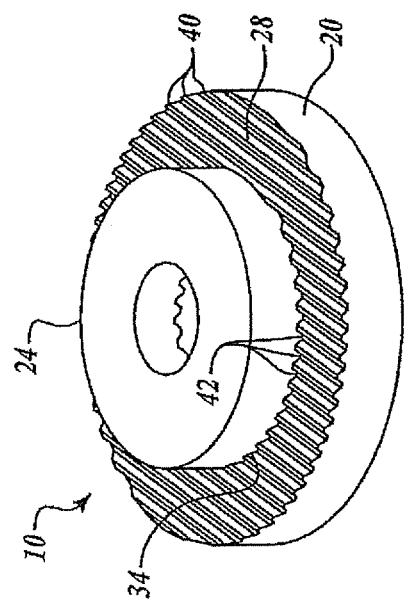
FIG. 4B is a perspective view of the compensator bushing of FIG. 2A and the lock bushing of FIG. 3A engaged with each other.
Figure 4A:
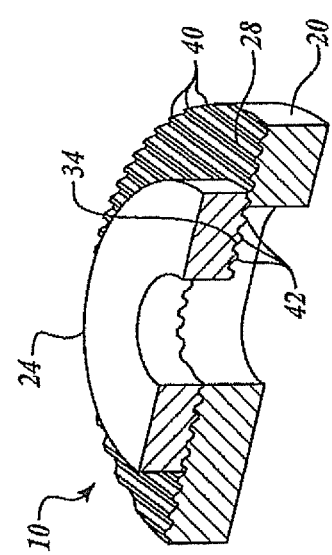
FIG. 4A is a partial cutaway perspective view of the compensator bushing of FIG. 2A and the lock bushing of FIG. 3A engaged with each other.

Referring additionally to FIGS. 4A and 4B, after the compensator bushing 20 is placed into the counter-bored hole 18 (not shown in FIGS. 4A and 4B), the surface 34 of the lock bushing 24 is placed against the surface 28 of the compensator bushing 20 such that "teeth" of the serrations 40 and 42 are received within (that is, engaged with) "valleys" of the serrations 42 and 40, respectively.

The means for engaging may be implemented in several ways in other exemplary embodiments, as desired. For example, referring now to FIG. 4C, in another exemplary embodiment the surface 34 of a lock bushing 24C and the surface 28 of a compensator bushing 20C may be treated with a surface treatment 54 to provide a non-skid type surface with an increased coefficient of static friction. The surface treatment 54 may be effected by any suitable, abrasive mechanical processing or by a suitable chemical processing, such as an acid bath or the like. After the compensator bushing 20C is placed into the counter-bored hole 18 (not shown in FIG. 4C), the surface 34 of the lock bushing 24C is placed against the surface 28 of the compensator bushing 20C such that the increased coefficient of static friction of the surface treatment 54 engages the lock bushing 24C and the compensator bushing 20C. This engagement is similar to a knurled or cross-hatched washer that is used to prevent a nut from loosening after installation.

Figure 4E:
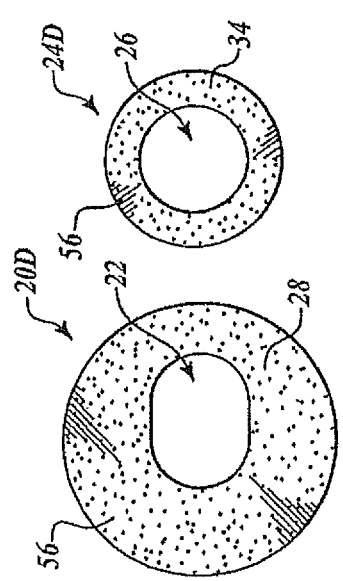
Figure 4G:
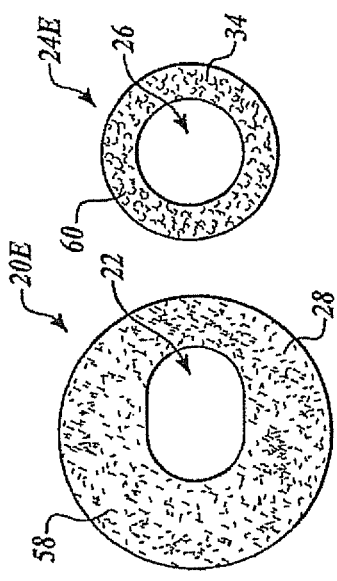
Figure 4F:
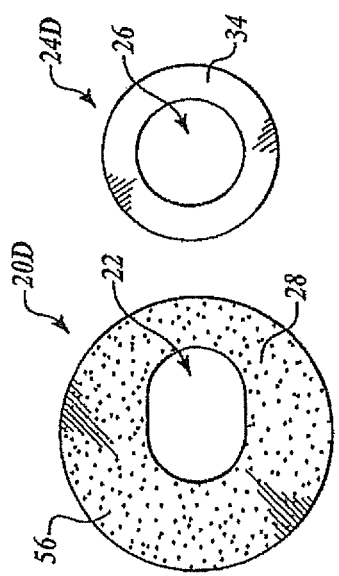

Referring now to FIGS. 4D, 4E, and 4F, in another exemplary embodiment an adhesive 56 may be affixed only to the surface 34 of a lock bushing 24D (FIG. 4D) or only to the surface 28 of a compensator bushing 20D (FIG. 4E) or to the surface 34 of the lock bushing 24D and to the surface 28 of the compensator bushing 20D (FIG. 4F), as desired. After the compensator bushing 20D is placed into the counter-bored hole 18 (not shown in FIGS. 4D, 4E, and 4F), the surface 34 of the lock bushing 24D is placed against the surface 28 of the compensator bushing 20D. The adhesive 56 is allowed to cure, thereby engaging the lock bushing 24D and the compensator bushing 20D.

Figure 4H:
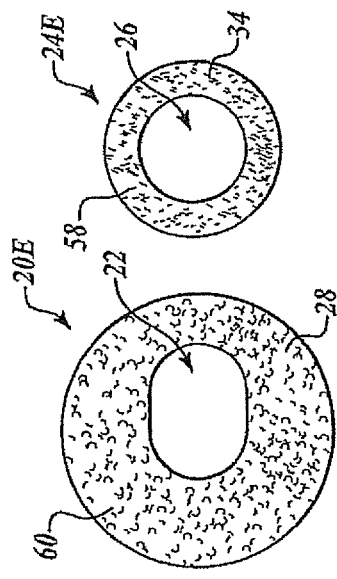

Referring now to FIGS. 4G and 4H, in another exemplary embodiment hook and loop fasteners may be used to engage a lock bushing 24E and a compensator bushing 20E in applications subject to light loading. Hooks 58 may be affixed to the surface 34 of the lock bushing 24E and loops 60 may be affixed to the surface 28 of the compensator bushing 20E (FIG. 4G). Alternately, the loops 60 may be affixed to the surface 34 of the lock bushing 24E and the hooks 58 may be affixed to the surface 28 of the compensator bushing 20E (FIG. 4H). After the compensator bushing 20E is placed into the counter-bored hole 18 (not shown in FIGS. 4G and 4H), the surface 34 of the lock bushing 24E is placed against the surface 28 of the compensator bushing 20E. The hooks 58 engage the loops 60, thereby engaging the lock bushing 24E and the compensator bushing 20E.

Figure 5B:
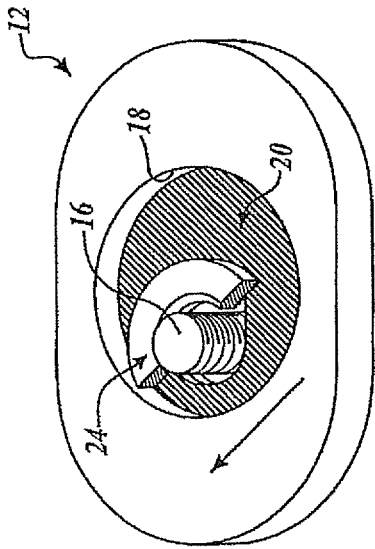
FIGS. 5A-5C are top plan views illustrating placement of an exemplary compensator bushing in a counter-bored hole.
Figure 5C:
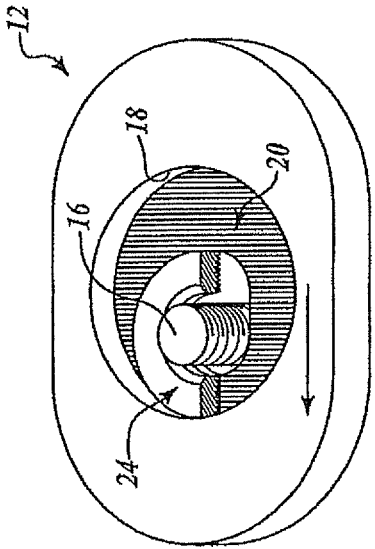
Figure 5A:
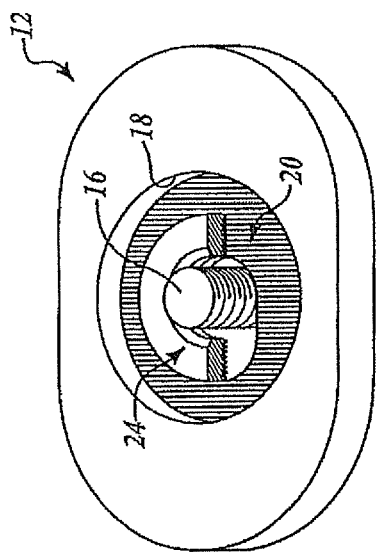

Referring now to FIGS. 5A, 5B, and 5C, the structure 12 is placed onto the fastener 16 that may or may not be mislocated. The compensator bushing 20 is rotated as desired (if at all) to compensate for any mislocation of the fastener. In FIG. 5A, the fastener 16 is centered. The compensator bushing 20 is placed onto the fastener 16 and fits into the counter-bored hole 18 without being rotated. The lock bushing 24 is placed onto and engages the compensator bushing 24.

In FIG. 5B, the fastener 16 is mislocated by an intermediate amount of variability. The compensator bushing 20 is placed onto the fastener 16 and is rotated until the compensator bushing 20 fits into the counter-bored hole 18. The lock bushing 24 is placed onto and engages the compensator bushing 24.

In FIG. 5C, the fastener 16 is mislocated by an amount of variability that is greater than that shown in FIG. 5B. The compensator bushing 20 is placed onto the fastener 16 and is rotated (more than the amount of rotation shown in FIG. 5B) until the compensator bushing 20 fits into the counter-bored hole 18. The lock bushing 24 is placed onto and engages the compensator bushing 24.

Referring now to FIGS. 1 AND 6, after the compensator bushing 20 is placed about the fastener 16 in the counter-bored hole 18 and the lock bushing 24 engages the compensator bushing 20, a washer 62 is placed onto the lock bushing 24. A nut 64 is placed onto threads of the fastener 16 and is tightened, thereby securing the structure 12 (and the compensator bushing 20 and the lock bushing 24) onto the fastener 16.

Figure 8A:
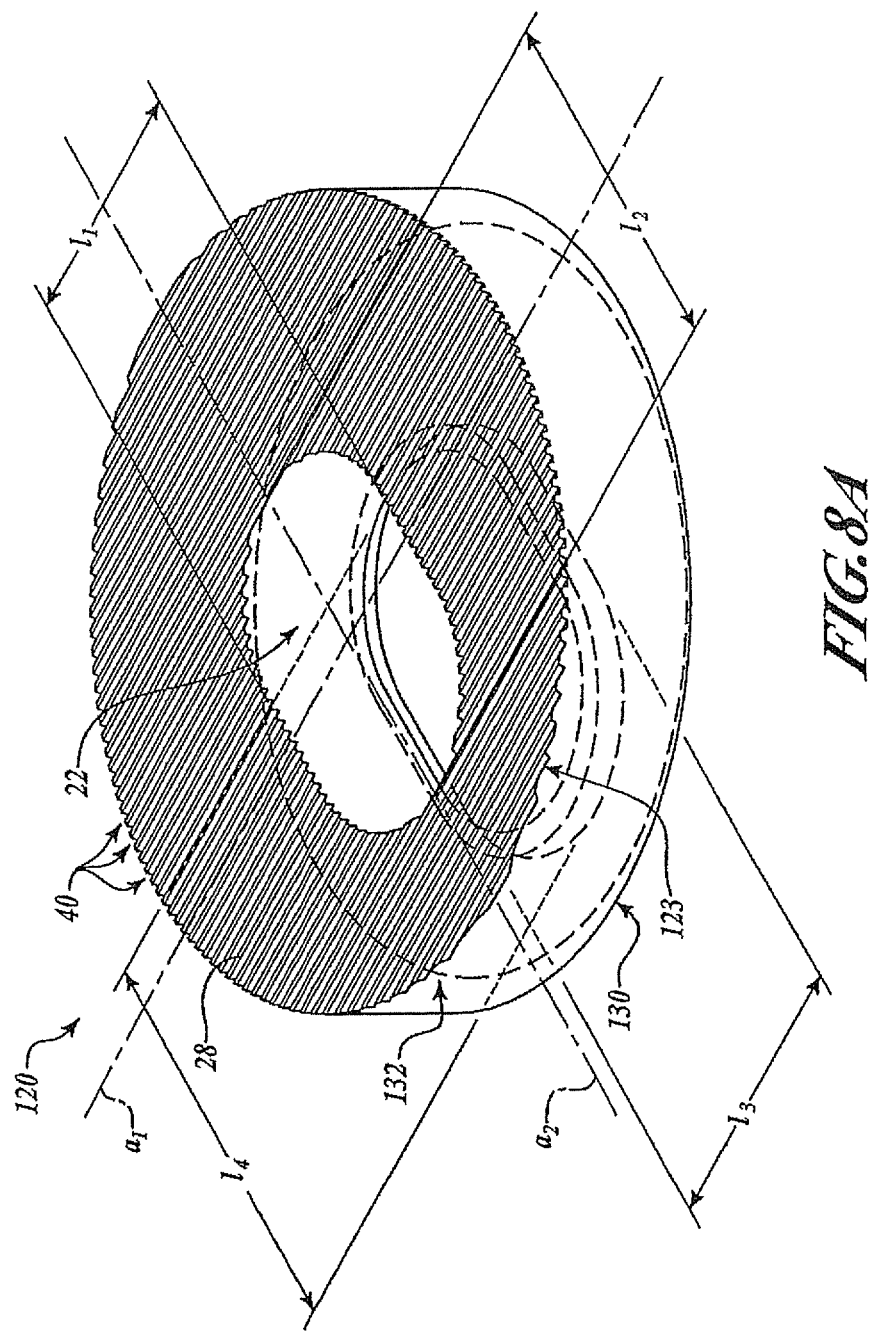
FIG. 8A is a perspective view of the exemplary compensator bushing of FIG. 7.
Figure 9A:
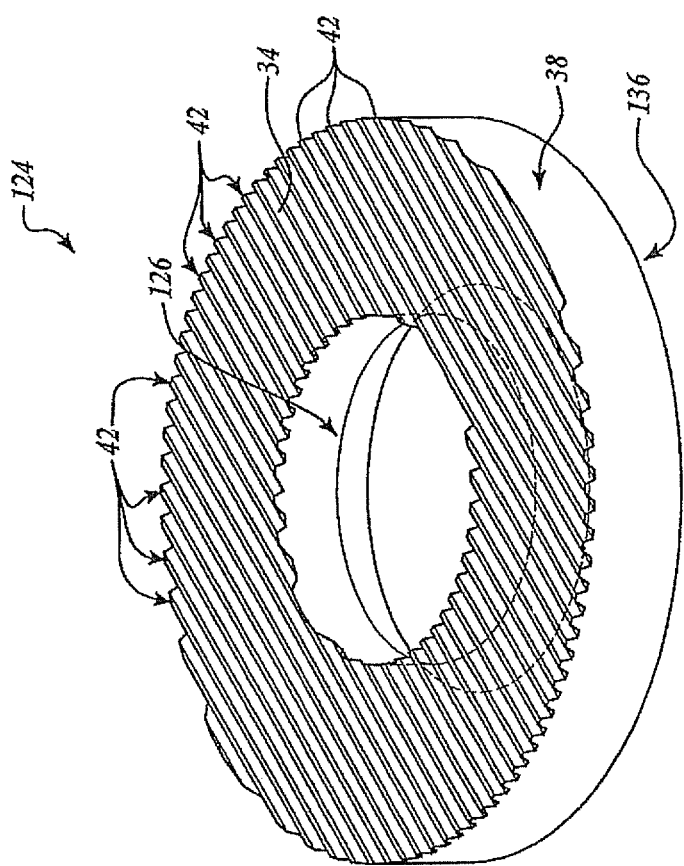
FIG. 9A is a perspective view of the exemplary lock bushing of FIG. 7.

Referring now to FIGS. 7, 8A, and 9A, in some applications such as modifications or alterations or retrofits or repairs made in the field, it may be desirable to provide a bushing assembly as a one-piece unit. To that end, and given by way overview of another non-limiting example, in an exemplary bushing assembly 110 a compensator bushing 120 defines a slot 122 therethrough that has the dimension $1_1$ along the axis $a_1$, that is sized to receive the fastener 16 (not shown) therethrough. The compensator bushing 120 has a dimension $1_2$ along an axis $a_2$ that is larger than the dimension $1_1$. The compensator bushing 120 defines a slot 123 therethrough that has a dimension $1_3$ along the axis $a_1$, that is bigger than the dimension $1_1$ and that has a dimension $1_4$ along the axis $a_2$ that is larger than the dimension $1_2$. A lock bushing 124 defines an opening 126 therethrough that is sized to receive the fastener 16 (not shown) therein. Means are provided for engaging the bushings 120 and 124. Details will now be set forth below.

Referring additionally to FIGS. 8B-8F, the compensator bushing 120 is similar to the compensator bushing 20 (FIGS. 2A-2F) except that the compensator bushing 120 additionally defines the slot 123. The slot 123 accommodates a retainer clip 102 and washer 104. Moreover, a side 132 of the compensator bushing 120 optionally may be chamfered over a thickness $t_3$, if desired, for radius relief. If provided, the chamfer may have any degree measurement as desired. The compensator bushing 120 includes the features that contribute to the means for engaging the lock bushing that are described above for the compensator bushing 20.

Referring now to FIGS. 9A-9F, the lock bushing 124 is similar to the lock bushing 24 (FIGS. 3A-3F) except an opening 126 optionally may be chamfered toward a surface 136, if desired. If provided, the chamfer may have any degree measurement as desired. The chamfer may accommodate receiving a one-piece nut 106 (FIG. 7) thereagainst without a washer.

Because the bushing assembly 110 is a one-piece assembly, the compensator bushing 120 is rotated until it fits into the counter-bored hole 18 (not shown) and the nut 106 is rotated to secure the structure 12 (not shown) onto the fastener 16 (not shown).

While a number of exemplary embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their scope.

What is claimed is:

1. A method of coupling a first structure and a second structure, the method comprising:
    disposing the first structure and the second structure against each other such that a fastener that extends from the second structure is received in a counter-bored hole defined in the first structure, an actual location of the fastener having a variability from a documented location of the fastener, the counter-bored hole being defined to receive the fastener in the documented location of the fastener;
    placing a first bushing into the counter-bored hole, the first bushing defining a first opening therethrough that has a first dimension along a first axis that is sized to receive the fastener therethrough and that has a second dimension along a second axis that is larger than the first dimension along the first axis;
    rotating the first bushing until the first bushing receives the fastener therein;
    placing a second bushing onto the first bushing, the second bushing defining a second opening therethrough that is sized to receive the fastener therein;
    engaging the first bushing and the second bushing with each other; and
    securing the first structure, the first bushing, and the second bushing onto the fastener, wherein the second structure comprises a portion of a building or vehicle and wherein the first structure comprises a mounted structure coupled to the second structure via an attachment point of the second structure, the attachment point including the fastener, and wherein the mounted structure comprises a portion of a false floor.

2. The method of claim 1, wherein the second bushing comprises a lock bushing.

3. The method of claim 1, wherein securing the first structure, the first bushing, and the second bushing onto the fastener comprises placing a nut over the fastener and tightening the nut.

4. The method of claim 1, wherein rotating the first bushing comprises rotating the first bushing along a third axis that is perpendicular to the first axis and perpendicular to the second axis.

5. The method of claim 4, wherein engaging the first bushing and the second bushing with each other comprises the second opening receiving the fastener.

6. The method of claim 1, wherein the first bushing and the second bushing are engaged with each other via a surface treatment of at least one of the first bushing and the second bushing.

7. A method comprising:
    extending a fastener from a second structure through a hole and a counterbore defined in a first structure;
    receiving the fastener through an elongated opening defined in a first bushing, wherein the elongated opening includes a slot, wherein a dimension along an axis of the slot is at least one-half an expected variability of position of the fastener from a documented location of the fastener;
    in the event that the fastener is not centered relative to the hole, adjusting a position of the first bushing relative to the fastener until the first bushing is received into the counterbore defined in the first structure;
    receiving the fastener through an opening defined in a second bushing; and
    securing the first structure, the first bushing, and the second bushing.

8. The method of claim 7, further comprising engaging the first bushing and the second bushing before securing the first structure, the first bushing, and the second bushing onto the fastener.

9. The method of claim 8, wherein engaging the first bushing and the second bushing comprises applying adhesive to at least one of the first bushing and the second bushing.

10. The method of claim 8, wherein engaging the first bushing and the second bushing comprises interlocking serrations on a first surface of the first bushing with serrations on a second surface of the second bushing.

11. The method of claim 8, wherein engaging the first bushing and the second bushing comprises engaging hook and loop fasteners coupled to surfaces of the first bushing and the second bushing.

12. The method of claim 7, wherein an assembly includes the first bushing and the second bushing in a retained position.

13. The method of claim 12, wherein the assembly further comprises a retained nut, wherein securing the first structure, the first bushing, and the second bushing onto the fastener comprises tightening the retained nut.

14. A method comprising:
    receiving a fastener through a first opening defined in a first bushing, wherein the first opening has a first dimension along a first axis that receives the fastener therethrough and has a second dimension along a second axis, wherein the second dimension enables receiving the fastener throughout an expected variability of position of the fastener, wherein the first opening includes a slot;
    rotating the first bushing about a third axis that is perpendicular to the first axis and perpendicular to the second axis until the first bushing is received into a counterbore in a structure;
    receiving the fastener through a second opening defined in a second bushing; and
    engaging the first bushing and the second bushing.

15. The method of claim 14, wherein at least one bushing of the first bushing and the second bushing includes a protrusion defined on a surface of the bushing, wherein another of the first bushing and the second bushing includes a receptacle defined in a surface of the other bushing, wherein engaging the first bushing and the second bushing comprises inserting the protrusion into the receptacle.

16. The method of claim 14, wherein the first bushing and the second bushing are engaged by an abrasive surface treatment defined on surfaces of the first bushing and the second bushing.

17. The method of claim 14, wherein wherein the second axis is perpendicular to and co-planar with the first axis.

18. The method of claim 14, wherein the dimension along the second axis of the slot is at least one-half the expected variability of position of the fastener from a documented location of the fastener.

19. The method of claim 14, wherein an assembly includes the first bushing and the second bushing in a retained position.

20. The method of claim 19, wherein the assembly further comprises a retained nut, wherein the method further comprises securing the structure, the first bushing, and the second bushing onto the fastener by tightening the retained nut.

\* \* \* \* \*